United States Patent
Chen et al.

(10) Patent No.: US 8,976,317 B2
(45) Date of Patent: Mar. 10, 2015

(54) DISPLAY DEVICE (71) Applicant: Innolux Corporation, Chu-Nan, Miao-Li County (TW)

(72) Inventors: Chien-Hung Chen, Chu-Nan (TW); Pi-Ying Chuang, Chu-Nan (TW); Chuan-Chung Wang, Chu-Nan (TW)

(73) Assignee: Innolux Corporation, Chu-Nan (TW)

( * ) Notice: Subject to any disclaimer, the term of this patent is extended or adjusted under 35 U.S.C. 154(b) by 178 days.

(21) Appl. No.: 13/846,601

(22) Filed: Mar. 18, 2013

(65) Prior Publication Data
US 2013/0278869 A1 Oct. 24, 2013

(30) Foreign Application Priority Data

Apr. 24, 2012 (TW) .............................. 101114606 A (51) Int. Cl.
G02F 1/1335 (2006.01)
G02F 1/1343 (2006.01)
G02F 1/137 (2006.01)

(52) U.S. Cl.
CPC ........ *G02F 1/1335* (2013.01); *G02F 1/133509* (2013.01); *G02F 1/133617* (2013.01); *G02F 1/13439* (2013.01); *G02F 1/133514* (2013.01); *G02F 1/137* (2013.01); *G02F 1/133528* (2013.01); *G02F 1/134363* (2013.01); *G02F 2001/133541* (2013.01); *G02F 2001/133614* (2013.01); *G02F 2001/133624* (2013.01); *G02F 2001/13793* (2013.01)
USPC ................................. 349/61; 349/69; 349/88

(58) Field of Classification Search
CPC .............. C09K 19/0275; C09K 19/586; G02F 1/134363; G02F 1/1393; G02F 1/133555; G02F 1/133509; G02F 1/133553; G02F 1/133514; G02F 1/133603; G02F 2001/13775; G02F 2001/13793; G02F 2001/133624; G02F 2001/133614
USPC ......... 252/299.01; 349/141, 104, 69, 117, 96, 349/179, 183, 61, 76, 88, 86, 71, 106; 428/1.1
See application file for complete search history.

(56) References Cited

U.S. PATENT DOCUMENTS

2013/0083271 A1* 4/2013 Tsai et al. ....................... 349/69

OTHER PUBLICATIONS

Chen et al., "A Microsecond-Response Polymer-Stabilized Blue Phase Liquid Crystal", Applied Physics Letters 99, 201105 (2011), American Institute of Physics, pp. 1-3.
Cheng et al., "Vertical Field Switching for Blue-Phase Liquid Crystal Devices", Applied Physics Letters 98, 261102 (2011), American Institute of Physics, pp. 1-3.

* cited by examiner

Primary Examiner — Thoi Duong
(74) Attorney, Agent, or Firm — Liu & Liu (57) ABSTRACT A display device comprising a first substrate, a second substrate, a blue phase liquid crystal layer and an optical element is provided. The first substrate has a display area and is opposite to the second substrate. The blue phase liquid crystal layer is disposed between the first and the second substrate and reflects a light selectively. The spectrum peak of the light is within an intersection interval corresponding to a cross point of x_bar, y_bar and z_bar stimulus value spectrums, and the intersection interval has a wavelength range from 480 nm to 520 nm. The optical element has at least one function for adjusting a phase of the light or absorbing the light.

20 Claims, 10 Drawing Sheets

DISPLAY DEVICE

This application claims the benefit of Taiwan application Serial No. 101114606, filed Apr. 24, 2012, the subject matter of which is incorporated herein by reference.

BACKGROUND

1. Field of the Invention

The invention relates in general to a display device, and more particularly to a display device selectively reflecting the light with specific spectrum peak.

2. Description of the Related Art

In recent years, the liquid crystal display (LCD) has been widely used in the display screen of electronic products. The LCD has different varieties such as twister nematic (TN), super twisted nematic, (STN), in-plane switching (IPS), and multi-domain vertical alignment (MVA). A voltage may be applied to control the rotation direction of liquid crystal molecules and adjust the polarization direction of the light so as to affect the light throughput and generate a contrast between the bright state and the dark state and display an image.

To control the direction of liquid crystal molecules, an alignment processing is performed on a surface of the substrate to control the alignment of liquid crystal molecules in a conventional display device using nematic liquid crystal. For example, a rubbing treatment is performed, that is, the surface of the alignment film coated on the surface of the substrate contacting the liquid crystal is rubbed. The rubbing treatment not only increases the manufacturing cost but also affects the display quality. The display device using nematic liquid crystal has a long response time which is not conducive to the dynamic image display in the sequential color method. The display device using nematic liquid crystal further requires a color filter to display a color image.

Therefore, the blue phase liquid crystal with fast response rate has become one of the focused research fields for the industries. The blue phase LCD device has the advantages of faster response rate, higher contrast, and wider viewing angle. However, the blue phase liquid crystal is driven by a higher driving voltage, and this is one of the problems in the conventional blue phase LCD device.

SUMMARY

The disclosure relates to a display device, and more particularly to a display device which uses a blue phase liquid crystal layer to selectively reflect a light having a specific spectrum peak, so as to decrease the required driving voltage.

According to an embodiment of the present invention, a display device comprising a first substrate, a second substrate, a blue phase liquid crystal layer and an optical element is provided. The first substrate has a display area and is opposite to the second substrate. The blue phase liquid crystal layer is disposed between the first and the second substrate and reflects a light selectively. A spectrum peak of the light is within an intersection interval corresponding to a cross point of x_bar, y_bar and z_bar stimulus value spectrums, and the intersection interval has a wavelength range from 480 nm to 520 nm. The optical element has at least one function for adjusting a phase of the light or absorbing the light.

According to another embodiment of the present invention, a display device comprising a first substrate, a second substrate, a blue phase liquid crystal layer and an optical element is provided. The first substrate has a display area and is opposite to the second substrate. The blue phase liquid crystal layer is disposed between the first and the second substrate and reflects a light selectively. The spectrum peak of the light is within an intersection interval corresponding to a cross point of x_bar, y_bar and z_bar stimulus value spectrums, and the intersection interval has a wavelength range from 560 nm to 600 nm. The optical element has at least one function for adjusting a phase of the light or absorbing the light.

The above and other aspects of the invention will become better understood with regard to the following detailed description but non-limiting embodiment(s). The following description is made with reference to the accompanying drawings.

DETAILED DESCRIPTION

A problem known by the inventor that the blue phase liquid crystal requires high operating bias, a solution thereof, and a display device developed by using the solution thereof are disclosed below.

When a blue phase LCD applies a bias to generate an electric field, the equivalent refraction index of the blue phase liquid crystal becomes anisotropic, and the birefringence effect occurs accordingly. The birefringence is expressed as: $\Delta n = \lambda K E^2$, wherein, $\lambda$ represents wavelength of the light; K represents Kerr coefficient; E represents electric field generated when a bias is applied thereto. Therefore, the applied bias can be reduced by increasing the Kerr coefficient K which is expressed as:

$$K \approx \Delta n \cdot \Delta \varepsilon \frac{\varepsilon_0 P^2}{k \lambda (2\pi)^2},$$

wherein, K represents a Kerr coefficient; $\Delta n$ represents birefringence; $\Delta \varepsilon$ represents dielectric anisotropy; k represents elasticity coefficient; P represents pitch.

As the range of operating temperature of the blue phase liquid crystal is narrow, a reticular formation of polymers can be used to stabilize the blue phase liquid crystal and increase the range of the operating temperature of the blue phase liquid crystal. The polymer stabilized blue phase liquid crystal (PSBPLC) normally comprises a liquid crystal molecule, a chiral substance and polymer. The PSBPLC does not change the high response rate of the blue phase liquid crystal, but the bias needs to be increased for adjusting the bright and dark states of the blue phase liquid crystal display. Moreover, when the amount of the chiral substance doped in the blue phase liquid crystal is increased, the liquid crystal clearing point is lowered, and the image displaying effect of liquid crystal deteriorates in a high temperature environment. The decrease in the amount of chiral substance doped in the blue phase liquid crystal not only avoids the clearing point being lowered but further increases the Kerr coefficient K so that the required bias can be reduced.

However, when the pitch is increased, the wavelength of the light reflected by the blue phase liquid crystal will change accordingly. According to Bragg's law, when the wavelength of the light is close to the dimension of the lattice of the blue phase liquid crystal, constructive interference of the light will occur and the light with specific wavelength will be reflected by the blue phase liquid crystal. According to Bragg's law, the wavelength peak of the light reflected by the blue phase liquid crystal can be expressed as:

$$\lambda \text{peak} = \frac{2nP}{\sqrt{(h^2 + k^2 + l^2)}},$$

wherein, n represents average index of refraction; P represents pitch; h, k, l represent Miller indices of liquid crystal lattice. The decrease in the amount of the chiral substance doped in the blue phase liquid crystal increases the pitch P of the blue phase liquid crystal and accordingly increases the wavelength peak $\lambda_{peak}$ of the reflected light, hence shifting the wavelength peak $\lambda_{peak}$ of the reflected light to the range of visible light (380~780 nm) and making the display generate strong reflection of the light in a bright environment. Therefore, a display device capable of reducing the reflection of the ambient light without affecting the luminous efficiency needs to be provided.

Figure 1A:
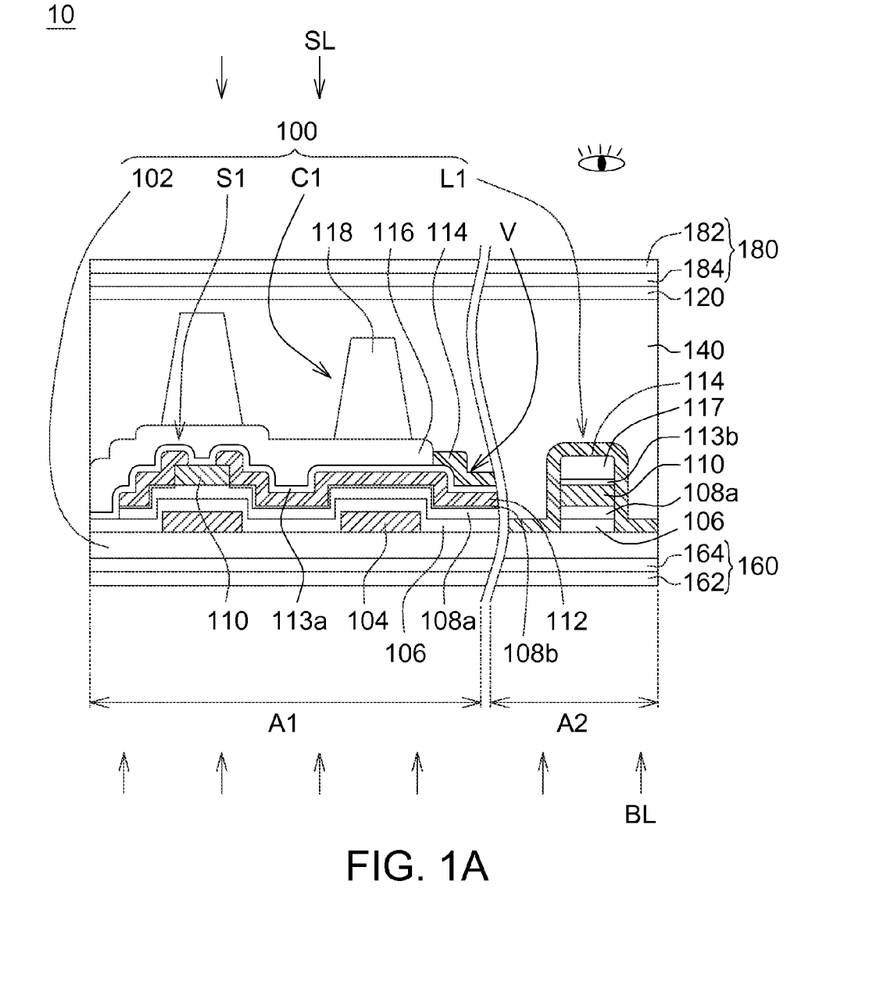
FIG. 1A shows a cross-sectional view of a display device according to an embodiment of the invention.
Figure 1B:
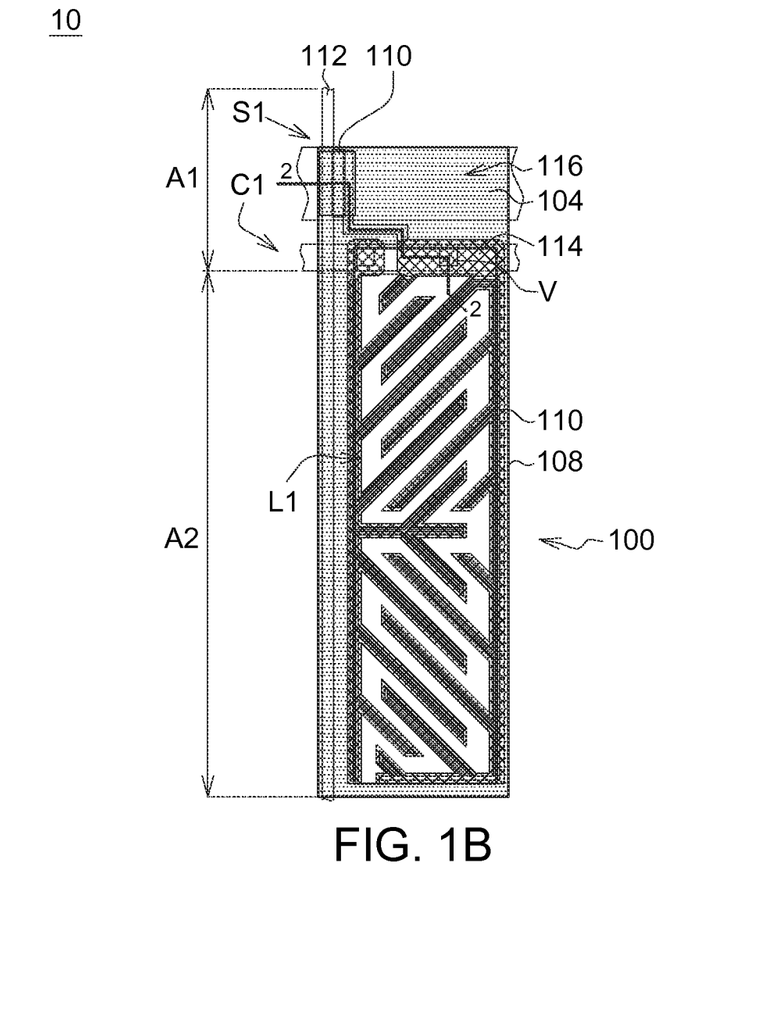
FIG. 1B shows a top view of a display device according to an embodiment of the invention.

Referring to FIGS. 1A~1B, a display device 10 according to an embodiment of the invention is shown. FIG. 1A shows a cross-section view of a display device 10 along a cross-sectional line 2-2 of FIG. 1B. As indicated in FIG. 1A, the display device 10 comprises a first substrate 100, a second substrate 120 and a blue phase liquid crystal layer 140. The blue phase liquid crystal layer 140 is disposed between the first substrate 100 and the second substrate 120. The first substrate 100 has a wire area A1 and a display area A2. The first substrate 100 comprises a base 102, a switch element S1, a capacitor C1 and an electrode structure L1. The extension segment between the capacitor C1 and the electrode structure L1 is omitted, and instead, an interrupted cross-section is illustrated. The switch element S1 and the capacitor C1 are disposed in the wire area A1. The electrode structure L1 is disposed within the display area A2. The electrode structure L1 may be used as a pixel electrode and/or a common electrode. The switch element S1 is electrically connected to the electrode structure L1.

In the present embodiment, the electrode structure L1 is rectangular and is formed by composite layers stacked together. The electrode structure L1 may also be formed by a single layer, and the invention is not limited thereto. The electrode structure L1 formed by stacked composite layers may comprise an oxide layer 106, an active layer 108a, an etch-stop layer 110, an dielectric layer 117, a protection layer 113b and an electric conductive layer 114. Alternatively, the electrode structure L1 may only comprise an etch-stop layer 110 and an electric conductive layer 114. Preferably, the electric conductive layer 114 covers other composite layers. However, the electric conductive layer 114 may also be disposed on other parts of the electrode structure L1, and the invention is not limited thereto. In addition, each stacked layer of the electrode structure L1 may have respective height and width, and the invention is not limited thereto.

In an embodiment, the dielectric layer 117 is formed by materials selected from a group consisting of oxides, silicide, nitrides, nitrogen oxides, resin and a combination thereof, the electric conductive layer 114 is formed by materials selected from a group consisting of metal, indium tin oxide, indium zinc oxide, zinc indium tin oxide, indium gallium zinc oxide and a combination thereof. The height of the electrode structure L1 is between 2~10 micrometers (μm), and the largest width of the electrode structure L1 is between 2~20 μm.

In an embodiment, the switch element S1, such as a thin film transistor (TFT) element, comprises a metal layer 104, an oxide layer 106, an active layer 108a, a doping layer 108b, an etch-stop layer 110, a metal layer 112, a protection layer 113a, a dielectric layer 116 and a gap adjustment layer 118. The protection layer 113a is disposed on a part of the metal layer 112 for protecting the metal layer 112. The dielectric layer 116 may comprise a light blocking layer and/or a protection layer. During the manufacturing process, the etch-stop layer 110 of the electrode structure L1 and the etch-stop layer 110 of the switch element S1 may be formed by the same material at the same time; the protection layer 113b of the electrode structure L1 and the protection layer 113a of the switch element S1 may also be formed by the same material at the same time. Thus, the height of the electrode structure L1 is increased without making the manufacturing process more complicated. In comparison to the conventional single-layered electrode layer, the electrode structure L1 of the present embodiment is thicker and provides a larger intensity of horizontal electric field when the same magnitude of voltage is applied thereto, and can be used in a PSBP LCD device which requires a larger electric field for driving the device.

As indicated in FIG. 1A, the display device 10 may further comprise an optical element 160 and an optical element 180 respectively disposed on the outer side of the first substrate 100 and that of the second substrate 120. The optical element 160 may comprise a polarizer 162 and a quarter wave plate 164. The optical element 180 may comprise a polarizer 182 and a quarter wave plate 184. The quarter wave plate 164 and the quarter wave plate 184 may adjust the phase of the light passing through the quarter wave plate 164 and the quarter wave plate 184 respectively. The polarizers 162 and 182 are disposed on the outer sides of the quarter wave plates 164 and 184 respectively.

Figure 2A:
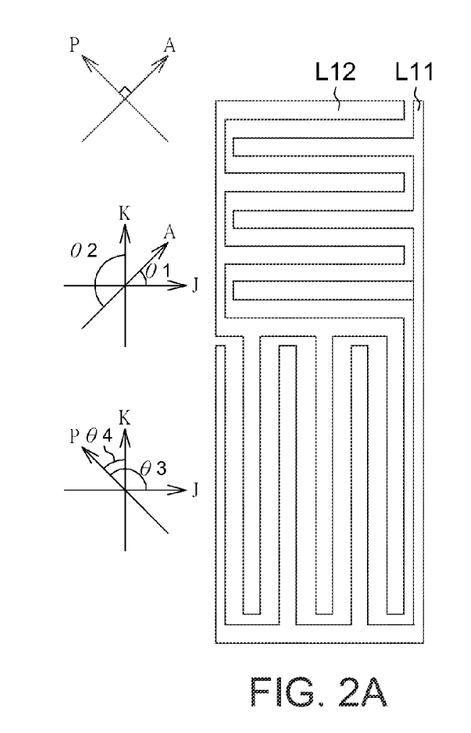
FIGS. 2A~2C show other types of an electrode structure according to an embodiment of the invention.
Figure 2B:
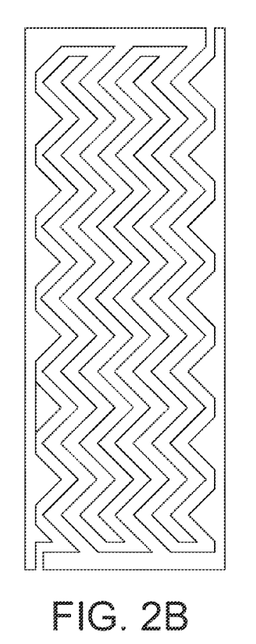
Figure 2C:
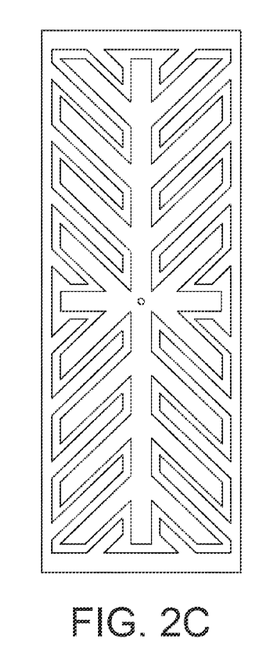

FIG. 1B shows a top view of a display device 10 according to an embodiment of the invention. The arrangement of the electrode structure L1 illustrated in FIG. 1B is for exemplification purpose only, not for limiting the arrangement of the electrode structure. The shape of the electrode structure may be symmetric or assymetric such as jagged, radial or comb-like. Referring to FIG. 2A~2C, top views of other types of the electrode structure L1 in FIG. 1B are shown.

Referring to FIG. 2A, the electrodes L11 and L12 of the electrode structure are arranged along a J-axial direction and a K-axial direction. The polarizing directions of the polarizers 162 and 182 (illustrated in FIG. 1A) are 0 degree (the A-axial direction) and 90 degrees (the P-axial direction) respectively. For the electrodes L11 and L12, an included angle θ1 is formed by the A-axis and the branch electrodes arranged along the J-axial direction; an included angle θ2 is formed by the A-axis and the branch electrodes arranged along the K-axial direction; an included angle θ3 is formed by the P-axis and the branch electrodes arranged along the J-axial direction; and an included angle θ4 is formed by the P-axis and the branch electrodes arranged along the K-axial direction. In the present embodiment, the angle θ1 is substantially equal to 45 degrees, the angle θ2 is substantially equal to 135 degrees, the angle θ3 is substantially equal to 135 degrees, and the angle θ4 is substantially equal to 45 degrees. Therefore, the angles formed by the direction of each electric field and the polarizing direction of the polarizer are about 45 degrees and 135 degrees respectively.

Figure 3A:
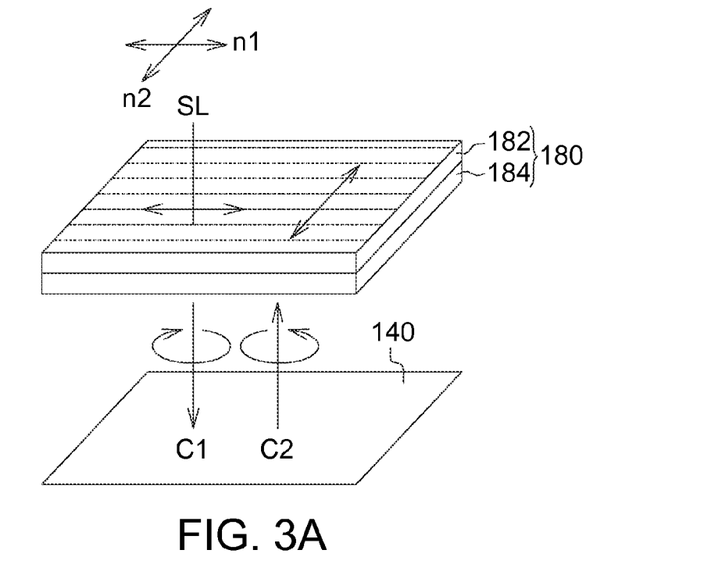
FIG. 3A shows a mechanism of a display device eliminating ambient reflective light according to an embodiment of the invention.

FIG. 3A shows a mechanism of a display device for eliminating ambient reflective light according to an embodiment of the invention. For convenience of elaboration, detailed structures of the display device 10 are simplified, and only the blue phase liquid crystal layer 140 and the optical element 180 are shown. The optical element 180 comprises a polarizer 182 and a quarter wave plate 184. The external ambient light SL along the n1-axis and the n2-axis, wherein the n1-axis and the n2-axis are perpendicular to each other. The polarizing direction of the polarizer 182 is along the n1-axis, and the angle formed by the polarizing direction of the polarizer 182 and the slow axis (not illustrated) of the quarter wave plate 184 is substantially equal to 45 degrees.

When an external ambient light SL enters the polarizer 182, only the light along the n1-axial direction passes through the polarizer 182 and proceeds to the quarter wave plate 184 which then performs a first phase adjustment and converts the light into a polarized light K1 (such as a right-handed rotation polarized light). Then, the polarized light K1 enters the blue phase liquid crystal layer 140 and is further reflected and converted by the blue phase liquid crystal layer 140 into an another polarized light K2 (such as a left-handed rotation polarized light). Then, the polarized light K2 passes through the quarter wave plate 184 again and undergoes a second time of phase adjustment which converts the light into a linear light along the n2-axial direction. Since the two times of phase adjustment exactly make the incoming ambient light SL adjusted from the n1-axial direction to the n2-axial direction by 90 degrees, the adjusted light is absorbed by the polarizer 182, and therefore the problem of the intensity of the reflected light being too strong is thus resolved.

In the present embodiment, the backlight module BL is disposed on the outer side of the polarizer 162. The backlight module BL may be realized by a white light source composed of a blue light emitting diode (LED) and a yellow phosphor, or a white light source composed of a blue LED, a blue LED plus a green phosphor, and a blue LED plus a red phosphor. Alternatively, the backlight module BL may be realized by a white light source composed of a blue LED, a red LED and a green LED, and the invention is not limited thereto. In an embodiment, the quarter wave plate 164 and the quarter wave plate 184 are omitted, and a dye layer, such as an organic dye layer, is used for absorbing the light with specific waveband, so that the light reflected by the blue phase liquid crystal layer 140 is absorbed and the problem of the intensity of the reflected light being too strong is thus avoided. The optical element with organic dye can be mixed in the blue phase liquid crystal layer 140 or the polarizer 182.

Figure 3B:
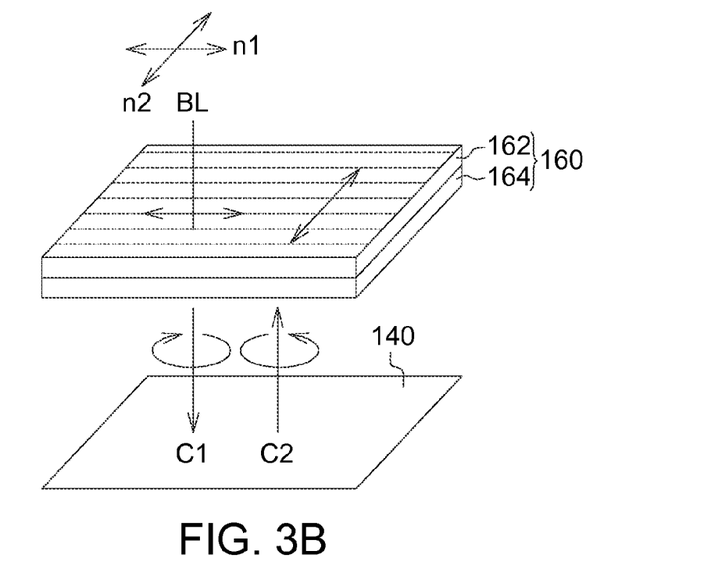
FIG. 3B shows a mechanism of an optical element absorbing a light of a backlight module of a display device according to an embodiment of the invention.

FIG. 3B shows a mechanism of absorbing the light of a backlight module BL of a display device by an optical element according to an embodiment of the invention. For convenience of elaboration, structures of the display device 10 (applicable to FIG. 1A) are simplified, and only the blue phase liquid crystal layer 140 and the optical element 160 are shown. The optical element 160 comprises a polarizer 162 and a quarter wave plate 164. The external ambient light SL proceeds along the n1-axial and the n2-axial, wherein the n1-axial and the n2-axial are perpendicular to each other. The inclined angle formed by the polarizing direction of the polarizer 162 and the slow axis (not illustrated) of the quarter wave plate 164 is substantially equal to 45 degrees.

In the present embodiment, the light emitted by the backlight module BL also proceeds along the n1-axial direction and the n2-axial direction. After the light enters the polarizer 162, only the light along the n1-axial direction continues to proceed to the quarter wave plate 164, which then performs a first phase adjustment on the light along the n1-axial direction and converts the light into a polarized light K1 (such as a right-handed rotation polarized light). Then, the polarized light K1 enters the blue phase liquid crystal layer 140, and is further reflected and converted by the blue phase liquid crystal layer 140 into an another polarized light K2 (such as a left-handed rotation polarized light). Then, the polarized light K2 passes through the quarter wave plate 164 again and undergoes a second time of phase adjustment which converts the light into a linear light proceeding along the n2-axial direction again. Since the two times of phase adjustment exactly make the light emitted by the backlight module BL adjusted from the n1-axial direction to the n2-axial direction by 90 degrees, the adjusted light is absorbed by the polarizer 162. Therefore, the luminous efficiency of the display device will deteriorate if the wave band of the light reflected by the blue phase liquid crystal layer 140 and absorbed by the polarizer 162 is not selected.

Figure 4:
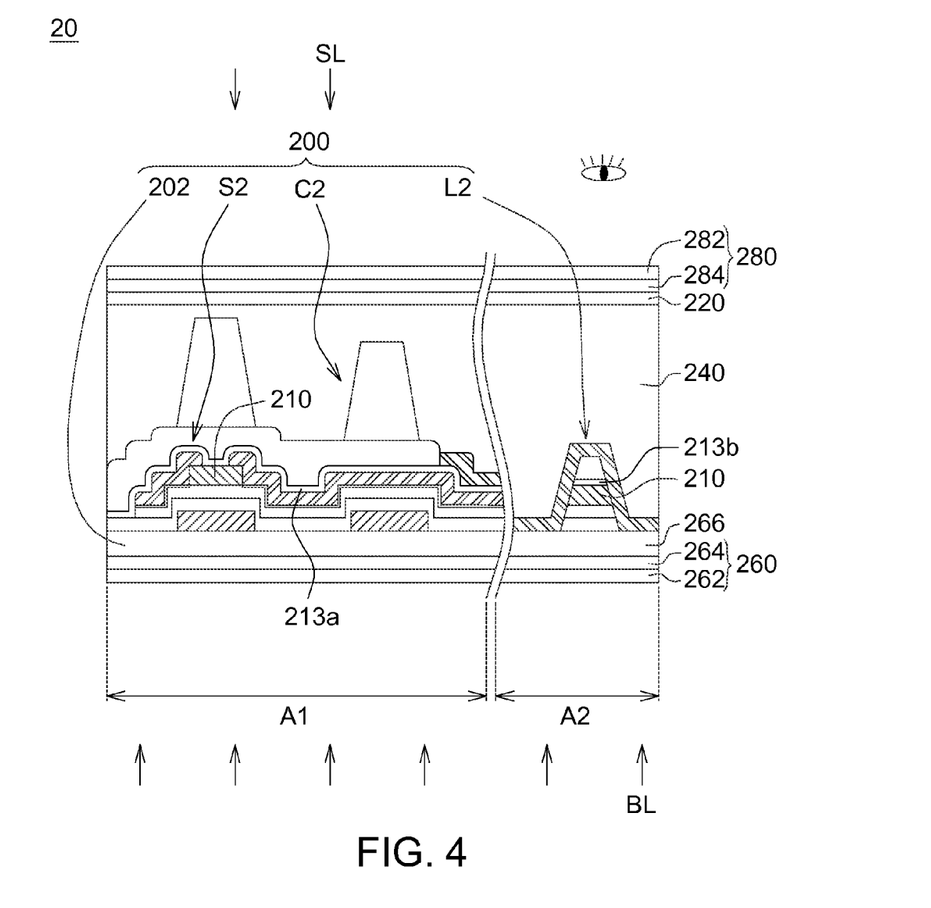
FIG. 4 shows a schematic diagram of a display device according to an embodiment of the invention.

Referring to FIG. 4, a schematic diagram of a display device 20 according to an embodiment of the invention is shown. As indicated in FIG. 4, the display device 20 comprises a first substrate 200, a second substrate 220 and a blue phase liquid crystal layer 240. The first substrate 200 has a wire area A1 and a display area A2. The first substrate 200 comprises a base 202, a switch element 204 and an electrode structure 206. The switch element S2 is disposed in the wire area A1. An electrode structure L2 is disposed in the display area A2. During the manufacturing process, the etch-stop layer 210 of the electrode structure L2 and the etch-stop layer 210 of the switch element S2 may be formed by the same material at the same time. The protection layer 213b of the electrode structure L2 and the protection layer 213a of the switch element S2 may be formed by the same material at the same time. The display device 20 and the display device 10 may be formed by the same elements and materials and using the same method. While the electrode structure L1 of the display device 10 is rectangular, the electrode structure L2 of the display device 20 can be trapezoidal. In other embodiments, the electrode structure may be formed by electrodes stacked in an asymmetrical and protruded manner as long as the width of the lower layer of the electrode structure is larger than or equal to that of the upper layer of the electrode structure, wherein the quantity of stacked layers is not subjected to any specific restrictions.

The operating mechanism between the external ambient light SL and the backlight module BL and the optical elements 260 and 280 of the display device 20 is identical to that between the external ambient light SL and the backlight module BL and the optical elements 160 and 180 of the display device 10, and is not repeated here. In other words, no matter the display device 10 or the display device 20, the wavelengths of the light reflected by the blue phase liquid crystal layers 140 and 240 may be selected to be within a specific wave band to avoid the luminous efficiency deteriorating. The selection of the wavelengths of the light reflected by the blue phase liquid crystal layers 140 and 240 is described below.

Figure 5:
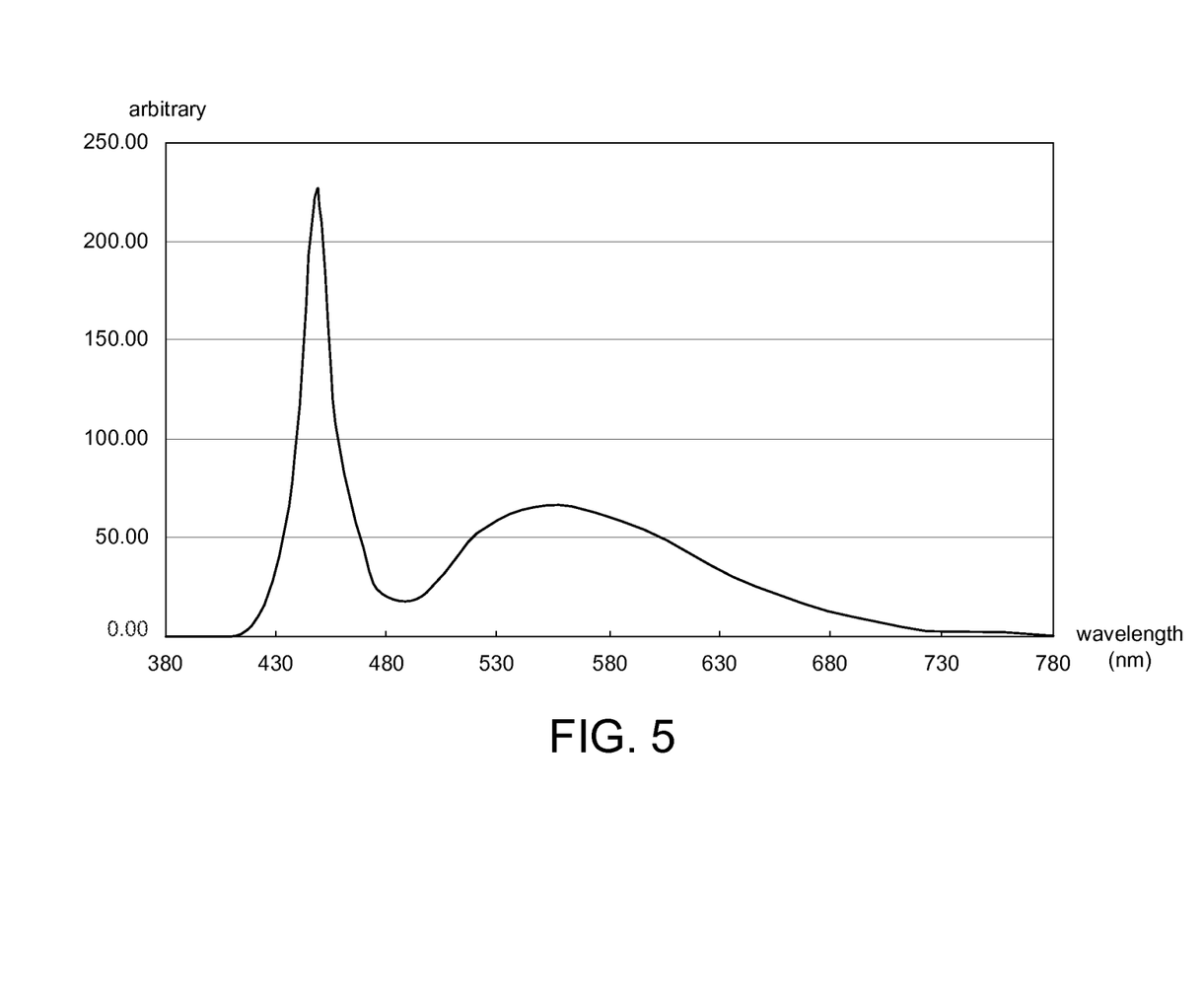
FIGS. 5~8 shows spectrum charts of backlight modules according to different embodiments of the invention.

FIG. 5 shows a spectrum chart of a backlight module BL according to an embodiment of the invention. The horizontal axis represents wavelength (nm), and the vertical axis represents relative intensity of the light, which is a relative value expressed in an arbitrary unit. As indicated in FIG. 5, the spectrum of the light source composed of a blue LED and a yellow phosphor shows that relatively smaller intensities occurred within the wavelength range from 490 nm to 500 nm. The light source composed of a blue LED and a yellow phosphor must be used in conjunction with a color filter for displaying the color image of each color.

Figure 6:
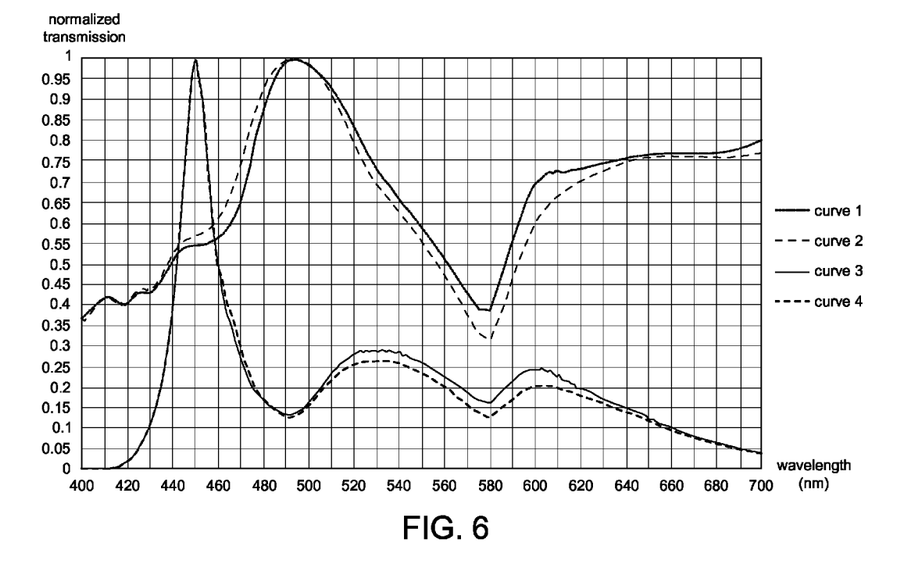
Figure 7:
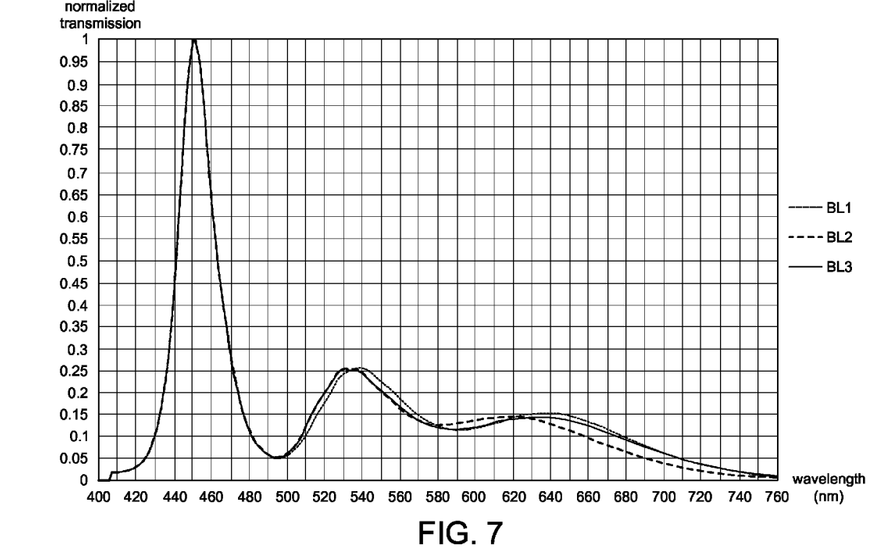
Figure 8:
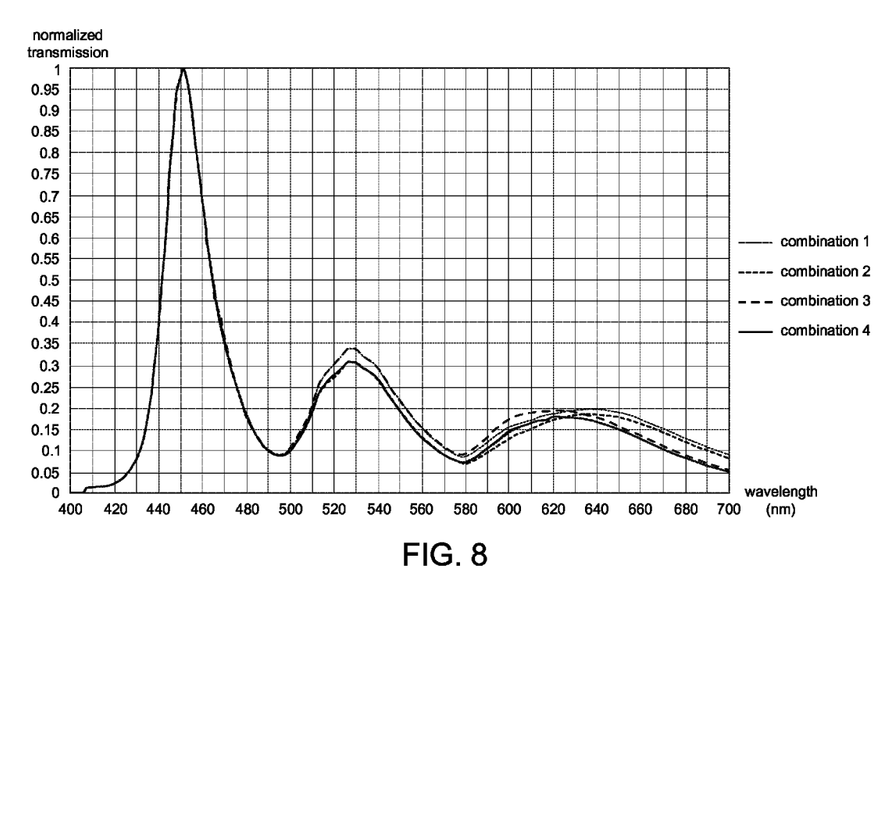

Referring to FIG. 6~8, spectrum charts of a backlight module BL according to different embodiments of the invention are shown. FIG. 6 shows an optical transmission spectrum obtained after a light emitted by a backlight module BL composed of a blue LED and a yellow phosphor passes through two different color filters. In the present embodiment, the color filters (not illustrated) may be disposed on the first substrate 100 in the form of a color filter on array (COA).

As indicated in FIG. 6, curve 1 shows an optical transmission spectrum of the first type of color filter; curve 2 shows an optical transmission spectrum of the second type of color filter; curve 3 shows an optical transmission spectrum obtained after a light emitted by a light source of FIG. 5 composed of a blue LED and a yellow phosphor passes through a first type of color filter; curve 4 shows an optical transmission spectrum obtained after a light emitted by a light source composed of a blue LED and a yellow phosphor of FIG. 5 passes through a second type of color filter. In the present embodiment, the valleys of curves 3 and 4 are very close to each other and the wavelengths of the valleys are substantially equal to 490 nm and 580 nm respectively. This indicates that the smallest intensity of the light emitted by a light source passing through a color filter occurs when the wavelength of the light is substantially equal to 490 nm and 580 nm. Moreover, after the light emitted by a light source passes through a color filter, the spectrum shows that the relatively weaker intensity occurs within the wavelength range from 470 nm to 510 nm and the wavelength range from 560 nm to 590 nm.

Referring to FIG. 7, a spectrum chart of the light emitted by a backlight module BL composed of a blue LED plus a green phosphor and a red phosphor is shown. Each curve represents the spectrum chart of the light emitted by a backlight module, and BL1~BL3 respectively represent backlight modules composed of a blue LED plus a green phosphor and a red phosphor. The light source composed of a blue LED plus a green phosphor and a red phosphor may be applied with the field sequential color (FSC) method without the disposition of a color filter. As indicated in FIG. 7, the spectrum of the light emitted by a light source composed of a blue LED plus a green phosphor and a red phosphor has two valleys located at 495 nm and 590 nm respectively, and relatively smaller intensities occur within the wavelength range from 470 nm to 520 nm and the wavelength range from 570 nm to 610 nm.

Referring to FIG. 8, an optical transmission spectrum obtained after of the light emitted by a backlight module BL composed of blue LED plus green phosphor and red phosphor passes through a color filter. The four curves of FIG. 8 represent spectrum charts of combinations 1~4. The four spectrum charts obtained after a light emitted by a backlight module passes through four color filters 1~4. As indicated in FIG. 8, after the light emitted by the light source passes through a color filter, the transmission of the color filter needs to be considered. Therefore, the two valleys in the spectrum of the light emitted by the light source change slightly and are located near 495 nm and near 580 nm respectively. Moreover, the spectrum shows that the relative weaker intensity occurred within the wavelength range from 475 nm to 515 nm and the wavelength range from 560 nm to 590 nm.

Figure 9:
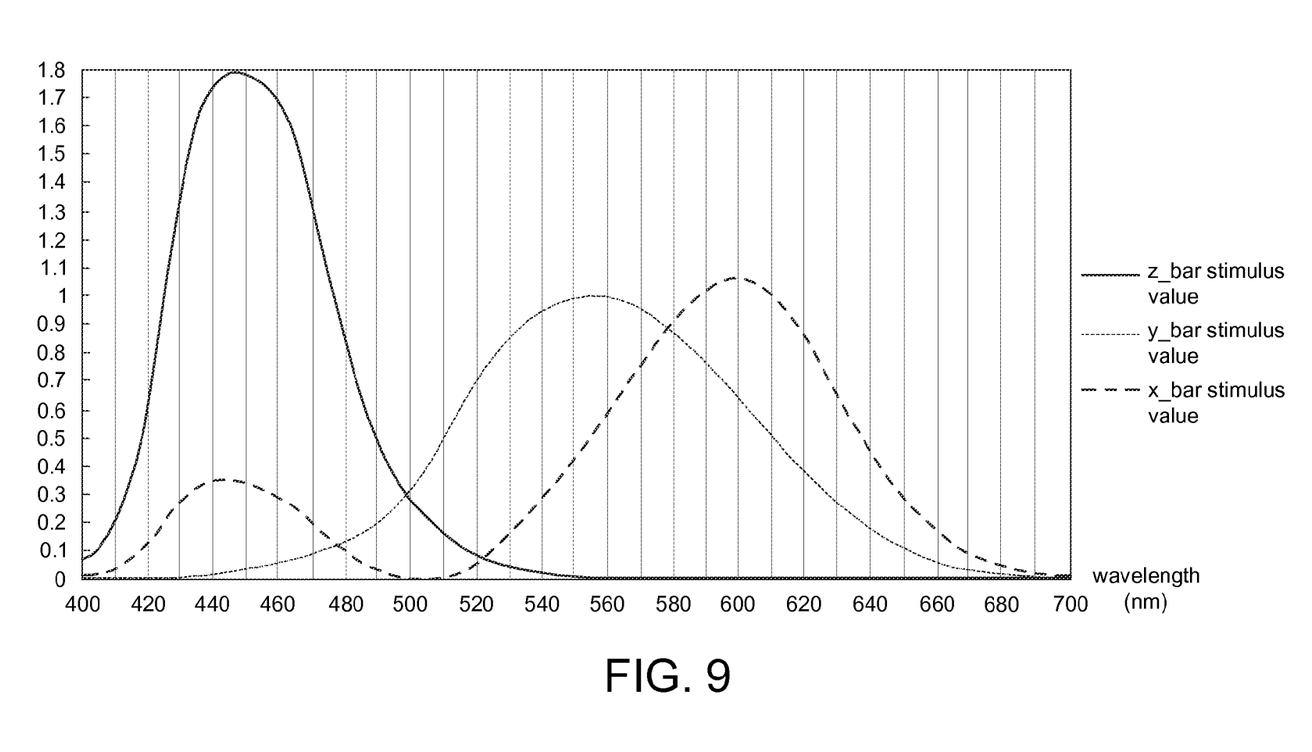
FIG. 9 shows a spectrum chart of a z_bar stimulus value, a y_bar stimulus value and an x_bar stimulus value.

The spectrum chart of FIG. 9 is based on 400~700 nm CIE 1931 standard photometric observer x_bar, y_bar and z_bar function. The x_bar stimulus value mainly contributes red color sensation and slight blue color sensation to human eyes. The y_bar stimulus value mainly contributes green color sensation to human eyes. The z_bar stimulus value mainly contributes blue color sensation to human eyes. As indicated in FIG. 9, the z_bar stimulus value and the y_bar stimulus value have an intersection corresponding to a wavelength of around 500 nm. An intersection interval is defined as the intersection between the z_bar stimulus value and y_bar the stimulus value+/−20 nm, and is substantially within an interval having a wavelength range from 480 nm to 520 nm. Preferably, the intersection interval has a wavelength range from 490 nm to 510 nm. The y_bar stimulus value and the x_bar stimulus value have an intersection corresponding to a wavelength of around 580 nm. Moreover, another intersection interval is defined as the intersection between the y_bar stimulus value and the x_bar stimulus value+/−20 nm, and is substantially within an interval having a wavelength range from 560 nm to 600 nm. Preferably, the intersection interval has a wavelength range from 570 nm to 590 nm.

In order to reduce the selective reflection of the blue phase liquid crystal layer, the peaks of the light reflected by the blue phase liquid crystal layers 140 and 240 of the display devices 10 and 20 respectively disclosed in the above embodiments are defined to be within an intersection intervals disclosed above. Referring to the descriptions of FIGS. 6 and 8, although the blue phase liquid crystal layers 140 and 240 selectively reflect the light whose wavelength is within the intersection interval, the light passing through the color filter and being within the intersection interval still has inferior transmission. In this case, the loss of the light intensity is lower, and the luminous efficiency of the display devices 10 and 20 can be maintained. That is, in the above embodiments of the invention, the wavelengths of the light selectively reflected by the blue phase liquid crystal layer are designed to be within an intersection interval, such that when the wavelength of the ambient light reflected by the blue phase liquid crystal layer is within the intersection interval, the ambient light reflected by the blue phase liquid crystal layer will be eliminated. As indicated in FIGS. 5~8, the light whose wavelength is within the intersection interval has inferior transmission. If the wavelength of the light emitted by the backlight module and reflected by the blue phase liquid crystal layer is also within the intersection interval, then the light passing through the blue phase liquid crystal layer only loses the part of the light whose wavelength is within the intersection interval. Since the intensity loss is smaller, the luminous efficiency of the display device can thus be maintained.

The above embodiments of the invention are summarized as follow. No matter the light source of the backlight module is used in conjunction with a color filter or not, the spectrum peak of the light selectively reflected by the blue phase liquid crystal layer is defined to be within an intersection interval. The light whose wavelength is within the intersection interval has relatively lower intensity and the transmission of the light passing through the color filter is also relatively lower. Even though the light is absorbed by a polarizer or an organic dye, the intensity loss of the light is lower and the luminous efficiency of the display device can thus be maintained.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
a first substrate having a display area;
a second substrate opposite to the first substrate;
a blue phase liquid crystal layer disposed between the first substrate and the second substrate, and the blue phase liquid crystal layer selectively reflecting a light, and a spectrum peak of the light being within an intersection interval corresponding to a cross point of x_bar, y_bar and z_bar stimulus value spectrums, and the intersection interval having a wavelength range from 480 nm to 520 nm; and
an optical element having at least one function for adjusting a phase of the light or absorbing the light.

2. The display device according to claim 1, wherein the intersection interval has a wavelength range from 490 nm to 510 nm.

3. The display device according to claim 1, wherein the optical element is disposed on at least one side of the blue phase liquid crystal layer.

4. The display device according to claim 1, further comprising a backlight module, the backlight module being used for providing a light source comprising at least one blue LED and at least one phosphor, and the phosphor comprising at least one of a yellow phosphor, a green phosphor and a red phosphor.

5. The display device according to claim 1, wherein the optical element comprises a quarter wave plate.

6. The display device according to claim 5, wherein the optical element further comprises a polarizer disposed on one side of the quarter wave plate, and an included angle formed by a polarizing axis of the polarizer and a slow axis of the quarter wave plate is substantially equal to 45 degrees.

7. The display device according to claim 1, wherein the optical element comprises a light-absorbing dye mixed in the blue phase liquid crystal layer.

8. The display device according to claim 1, wherein the first substrate comprises:
a base;
a plurality of electrode structures disposed on the base; and
a plurality of switch elements disposed on the base and electrically connected to the corresponding electrode structure, and each electrode structure being formed by layered, trapezoidal, T-shaped or asymmetrically protruded electrodes.

9. The display device according to claim 8, wherein each electrode structure comprises an electric conductive layer and an etch-stop layer covered by the electric conductive layer, each switch element has another etch-stop layer, and the etch-stop layer and the another etch-stop layer are formed by the same material at the same time.

10. The display device according to claim 9, wherein each electrode structure further comprises a dielectric layer formed by materials selected from a group consisting of oxides, silicide, nitrides, nitrogen oxides, resin and a combination thereof.

11. A display device, comprising:
a first substrate having a display area;
a second substrate opposite to the first substrate;
a blue phase liquid crystal layer disposed between the first substrate and the second substrate, and the blue phase liquid crystal layer selectively reflecting a light, a spectrum peak of the light being within an intersection interval corresponding to a cross point of x_bar, y_bar and z_bar stimulus value spectrums, and the intersection interval having a wavelength range from 560 nm to 600 nm; and
an optical element having at least one function for adjusting a phase of the light or absorbing the light.

12. The display device according to claim 11, wherein the intersection interval has a wavelength range from 570 nm to 590 nm.

13. The display device according to claim 11, wherein the optical element is disposed on at least one side of the blue phase liquid crystal layer.

14. The display device according to claim 11, further comprising a backlight module, the backlight module being used for providing a light source and comprising at least one blue LED and at least one phosphor, and the phosphor comprising at least one of a yellow phosphor, a green phosphor and a red phosphor.

15. The display device according to claim 11, wherein the optical element comprises a quarter wave plate.

16. The display device according to claim 15, wherein the optical element further comprises a polarizer disposed on one side of the quarter wave plate, and an included angle formed by a polarizing axis of the polarizer and a slow axis of the quarter wave plate is substantially equal to 45 degrees.

17. The display device according to claim 11, wherein the optical element comprises a light-absorbing dye mixed in the blue phase liquid crystal layer.

18. The display device according to claim 11, wherein the first substrate comprises:
a base;
a plurality of electrode structures disposed on the base; and
a plurality of switch elements disposed on the base and electrically connected to the corresponding electrode structure, and each electrode structure being formed by layered, trapezoidal, T-shaped or asymmetrically protruded electrodes.

19. The display device according to claim 18, wherein each electrode structure comprises an electric conductive layer and an etch-stop layer covered by the electric conductive layer, each switch element has another etch-stop layer, and the etch-stop layer and the another etch-stop layer are formed by the same material at the same time.

20. The display device according to claim 19, wherein each electrode structure further comprises a dielectric layer formed by materials selected from a group consisting of oxides, silicide, nitrides, nitrogen oxides, resin and a combination thereof.

* * * * *